Feb. 6, 1940.   G. F. HEATH   2,189,207
CONDUIT
Filed Nov. 27, 1936

INVENTOR
George F. Heath.
BY
ATTORNEY

Patented Feb. 6, 1940

2,189,207

UNITED STATES PATENT OFFICE 2,189,207

CONDUIT

George F. Heath, St. Louis, Mo.

Application November 27, 1936, Serial No. 112,848

1 Claim. (Cl. 138—47)

This invention relates generally to conduits and, more particularly, to a certain new and useful improvement in sheathing or conduits especially, though not exclusively, adapted for housing electrical line-wires and the like in electrical installations.

It is common practice in electrical wiring installations to enclose or house the wires in a rigid casing or conduit for protection against physical damage—fire, water, and the like, the sheathing normally employed being in the form of steel pipe or tubing fabricated with smooth, even, and parallel inner and outer faces. It is necessary, however, in most installations to bend and twist the pipe to bring it into conformation with the walls, ceiling, or floors of the structure in which the installation is being made. The tortuous path which most electrical conduit lines must follow, therefore, makes it exceedingly difficult to draw the wires therethrough to complete the installation. This difficulty has been found to result from the excessive friction between the outer face of the wire or the insulation thereof and the inner face of the conduit or pipe.

Further, when the wires are in use the electrical current passing therethrough creates or generates a measurable amount of heat, expansion of the wires resulting. Present forms of conduit pipe, so far as I am aware, make no provision for such expansion, so that the expanding wires jam against one another and against the walls of the conduit, thereby abrading the insulation and frequently causing the latter to wear and become ineffective.

My invention, hence, has for its object the provision of a wire conduit or pipe so uniquely constructed to not only eliminate or overcome the frictional resistance mentioned, but also to permit heat expansion of the enclosed or housed wires with a practically complete elimination of abrasion of the insulation, and the easy fabrication of bends and offsets.

And with the above and other objects in view, my invention resides in the novel features of form, construction, arrangement, and combination of parts presently described and pointed out in the claim.

In the accompanying drawing—

Figure 1:
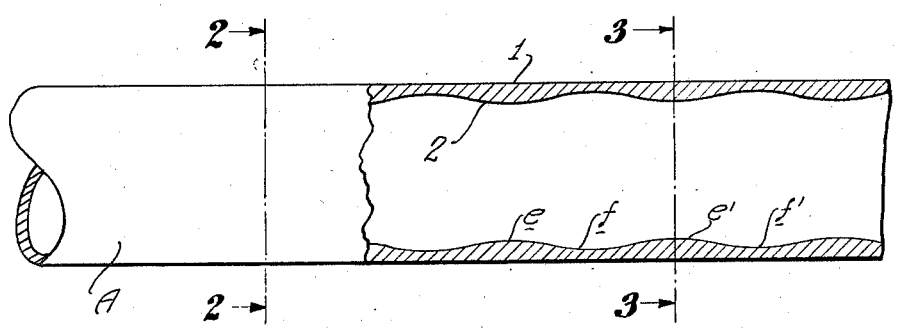
Figure 2:
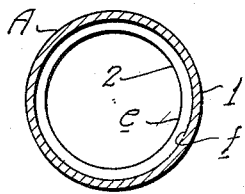
Figure 3:
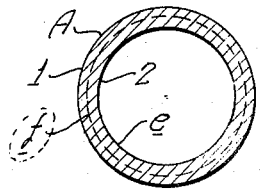

Figure 1 is a side elevational view, partly broken away and in section, of a section of conduit or pipe constructed in accordance with and embodying my present invention; and Figures 2 and 3 are cross-sectional views of the conduit or pipe, taken, respectively, approximately along the lines 2—2 and 3—3, Figure 1.

Referring now more in detail and by reference characters to the drawing, which illustrates a preferred embodiment of my invention, A designates a section of the conduit or pipe, which preferably has a smooth cylindrical outer face or periphery 1 and a sinuous inner face or periphery 2, which latter, while also smooth, in longitudinal section, presents a serpentine-like or sine-wave characteristic, having a substantial distance between adjacent crests $e$, $e'$. In transverse cross-section, however, the inner periphery 2 is circular, the inside diameter of the conduit A varying, of course, to correspond with its sinuous longitudinal contour. Thus, the smallest inside diameter of the conduit A will occur at the so-called crests $e$, $e'$, while the largest inside diameter will occur at the so-called valleys $f$, $f'$, as best seen in Figures 2 and 3.

The tubing or conduit A having such inside contour may be constructed in any manner suitable to the manufacture of such materials, though I prefer to impress the sinuous contour on a flat elongated strip of metal and then form and weld the strip into a pipe or tube in the manner familiar to those skilled in the art of welded pipe making.

It will be apparent that, as electric wires are drawn through a conduit A constructed in such manner, surface contact will only take place at the crest-portions $e$, $e'$, of the inner periphery of the conduit, thereby reducing frictional resistance to an absolute minimum, and also permitting easy or facile bending of the conduit to meet the requirements of any particular installation. In addition, the crest-like portions $e$, $e'$ will not tend to scrape insulation material from the outer face of the wire and fill up the indentations, but will allow the wire to slide smoothly through the bore of the conduit. Further, since the spaces between the crests $e$, $e'$, are substantial in size, any small amount of insulation material which may be removed from the outer face of the wire will drop into such spaces and will, therefore, not interfere with the passage of the wire. Finally, the wire normally rests in a straight line between crests $e$, $e'$, so that, when expansion, due to heat, occurs, the wire will sag slightly into the "inter-crest" spaces or valleys $f$, $f'$, thereby obviating any tendency of the wires to jam up in the conduit and become abraded.

The conduit may be readily and economically manufactured, is simple and durable in structure, and is efficient in the performance of its intended functions.

It will be understood that changes and modifications in the form, construction, arrangement, and combination of the several parts of the conduit may be made and substituted for those herein shown and described without departing from the nature and principle of my invention.

Having thus described my invention, what I claim and desire to secure by Letters Patent is:

A wire-conduit having a drag-reducing inner surface, the longitudinal contour of which conforms to the shape of a sinuous curve consisting of a series of uniform radially extending gently rounded valleys and crests, the arcuate distance between any two consecutive crests being substantially greater than the radial altitude of the crests.

GEORGE F. HEATH.